(12) United States Patent
Baumeister et al.

(10) Patent No.: US 9,885,469 B2
(45) Date of Patent: Feb. 6, 2018

(54) OVEN LIGHT

(71) Applicant: BJB GmbH & Co. KG, Amsberg (DE)

(72) Inventors: Olaf Baumeister, Sundern (DE); Detlef Scholz, Soest (DE)

(73) Assignee: BJB GmbH & Co. KG, Arnsberg (DE)

( * ) Notice: Subject to any disclaimer, the term of this patent is extended or adjusted under 35 U.S.C. 154(b) by 0 days.

(21) Appl. No.: 15/153,166

(22) Filed: May 12, 2016

(65) Prior Publication Data

US 2017/0059143 A1  Mar. 2, 2017

(30) Foreign Application Priority Data

Aug. 27, 2015  (DE) .............................. 102015114253

(51) Int. Cl.
*F24C 15/00*   (2006.01)
*A21B 3/10*    (2006.01)
(Continued)

(52) U.S. Cl.
CPC .............. *F21V 29/503* (2015.01); *A21B 3/10* (2013.01); *F21V 29/15* (2015.01); *F21V 29/773* (2015.01); *F21V 29/85* (2015.01); *F21V 29/87* (2015.01); *F21V 33/0044* (2013.01); *F24C 15/008* (2013.01); *H05B 6/6444* (2013.01); *F21W 2131/307* (2013.01); *F21Y 2115/10* (2016.08)

(58) Field of Classification Search
CPC ........ F21V 29/15; F21V 29/503; F21V 29/85; F21V 33/044; F21V 29/779; F21V 29/87; F21V 29/773; F21Y 2115/10; F21W 2131/307; F24C 15/008; F24C 15/12; A21B 3/10; H05B 6/6444
See application file for complete search history.

(56) References Cited

U.S. PATENT DOCUMENTS 4,814,952 A * 3/1989 Hammerl .............. F24C 15/008
                                                    219/758
4,880,955 A * 11/1989 Nitzinger ................. A21B 3/10
                                                   126/19 R
(Continued)

FOREIGN PATENT DOCUMENTS

DE         1194343 B1    12/1962
DE      102005044347 A1   3/2007
(Continued)

*Primary Examiner* — Daniel Walsh
(74) *Attorney, Agent, or Firm* — Von Rohrscheidt Patents

(57) ABSTRACT

An oven light including an attachment sleeve which is attachable in a recess of a cooking cavity wall; a light permeable cover which closes the recess of the cooking cavity wall; an illuminant which is arranged behind the light permeable cover and whose emitted light is used for illuminating the cooking cavity, wherein the illuminant is formed by at least one LED which emits light in a light cone (K), wherein the LED is arranged on a cooling element which dissipates operating heat of the LED, wherein a heat barrier is arranged between the cover and the LED and protects the LED from a cooking temperature, wherein the light cone penetrates an arrangement plane of the heat barrier, characterized in that the heat barrier includes at least one in particular light permeable heat shield with an opening through which light of the LED propagates in a direction towards the cover.

10 Claims, 6 Drawing Sheets

(51) Int. Cl.
*H05B 6/64* (2006.01)
*F21V 29/503* (2015.01)
*F21V 29/77* (2015.01)
*F21V 29/85* (2015.01)
*F21V 29/87* (2015.01)
*F21V 33/00* (2006.01)
*F21V 29/15* (2015.01)
*F21Y 115/10* (2016.01)
*F21W 131/307* (2006.01)

(56) References Cited

U.S. PATENT DOCUMENTS

| | | | | |
|---|---|---|---|---|
| 6,093,918 | A * | 7/2000 | Sohn | H05B 6/642 126/21 A |
| 6,094,262 | A * | 7/2000 | Almeida | G01N 21/4133 356/130 |
| 6,288,491 | B1 * | 9/2001 | Ramaiah | H01J 61/827 315/52 |
| 6,575,157 | B1 * | 6/2003 | Shaver | F24C 15/2042 126/201 |
| 7,874,690 | B2 * | 1/2011 | Weber, III | F21K 9/00 219/220 |
| 8,750,671 | B1 * | 6/2014 | Kelly | F21V 3/049 362/335 |
| 8,948,564 | B1 * | 2/2015 | Sherman | F21K 9/232 362/335 |
| 8,997,732 | B2 * | 4/2015 | Oagley | F24C 15/2064 126/213 |
| 9,482,436 | B1 * | 11/2016 | Hettinger | F24C 15/008 |
| 2001/0009128 | A1 * | 7/2001 | Backus | A47J 37/041 99/421 H |
| 2002/0023547 | A1 * | 2/2002 | Backus | A47J 37/042 99/427 |
| 2002/0092842 | A1 * | 7/2002 | Loveless | F24C 7/10 219/400 |
| 2003/0208113 | A1 * | 11/2003 | Mault | A61B 5/14532 600/316 |
| 2004/0015198 | A1 * | 1/2004 | Skarstad | A61N 1/378 607/36 |
| 2005/0022676 | A1 * | 2/2005 | Swank | A21B 3/02 99/419 |
| 2005/0034611 | A1 * | 2/2005 | McLemore | A47J 37/1209 99/413 |
| 2005/0156032 | A1 * | 7/2005 | Milstein | G06Q 30/06 235/383 |
| 2005/0205545 | A1 * | 9/2005 | Siegel | A47J 37/0623 219/386 |
| 2006/0254432 | A1 * | 11/2006 | McLemore | A47J 37/1209 99/448 |
| 2006/0278216 | A1 * | 12/2006 | Gagas | F24C 15/2028 126/299 D |
| 2006/0289436 | A1 * | 12/2006 | Carbone | F24C 15/325 219/400 |
| 2007/0059672 | A1 * | 3/2007 | Shaw | G09B 19/0092 434/127 |
| 2009/0071463 | A1 * | 3/2009 | Ebert | F24C 15/008 126/273 R |
| 2009/0075041 | A1 * | 3/2009 | Schweiggart | B60R 13/0838 428/209 |
| 2009/0107482 | A1 * | 4/2009 | Agustin | F24C 15/12 126/299 C |
| 2009/0316385 | A1 * | 12/2009 | Weber | F21K 9/00 362/92 |
| 2010/0033972 | A1 * | 2/2010 | Maglica | F21K 9/00 362/294 |
| 2010/0226139 | A1 * | 9/2010 | Lynch | F21S 8/02 362/373 |
| 2012/0000455 | A1 * | 1/2012 | Reinhard-Herrscher | F24C 15/008 126/19 R |
| 2012/0125911 | A1 * | 5/2012 | Shaffer | F24C 15/008 219/393 |
| 2012/0127729 | A1 * | 5/2012 | Brown | F21V 33/0044 362/310 |
| 2012/0170247 | A1 * | 7/2012 | Do | H05B 6/6444 362/92 |
| 2012/0175365 | A1 * | 7/2012 | Do | F21V 33/0044 219/758 |
| 2013/0032634 | A1 * | 2/2013 | McKirdy | G06Q 30/0271 235/375 |
| 2013/0081610 | A1 * | 4/2013 | Eichelberger | F24C 15/008 126/273 R |
| 2013/0105565 | A1 * | 5/2013 | Kamprath | G06F 19/3475 235/375 |
| 2014/0063180 | A1 * | 3/2014 | Sharma | G08C 19/00 348/36 |
| 2015/0168365 | A1 * | 6/2015 | Connor | G01N 33/02 356/51 |
| 2016/0034764 | A1 * | 2/2016 | Connor | G06K 9/00771 348/158 |
| 2016/0035248 | A1 * | 2/2016 | Gibbs | G06T 7/0002 434/127 |
| 2016/0047966 | A1 * | 2/2016 | Schenkl | F25D 27/00 362/606 |
| 2016/0320069 | A1 * | 11/2016 | Hettinger | F24C 15/008 |
| 2017/0059143 | A1 * | 3/2017 | Baumeister | F21V 29/503 |
| 2017/0205078 | A1 * | 7/2017 | Hildner | F24C 7/082 |

FOREIGN PATENT DOCUMENTS

| | | |
|---|---|---|
| DE | 102009002775 A1 | 11/2010 |
| DE | 3742509 A1 | 1/2014 |
| DE | 102012211202 A1 | 1/2014 |
| EP | 2233839 A1 | 9/2010 |
| EP | 2251588 A2 | 11/2010 |

* cited by examiner

OVEN LIGHT

RELATED APPLICATIONS

This application claims priority from German Patent Application DE 10 2015 114 253.8 filed on Aug. 27, 2015 which is incorporated in its entirety by this reference.

FIELD OF THE INVENTION

The invention relates to an oven light.

BACKGROUND OF THE INVENTION

Oven lights are known in the art in many configurations. When LEDs are used as illuminants efforts are being made in the art to either effectively dissipate heat that is radiated from the oven cooking chamber in a portion of the LED illuminant effectively or to protect the LED from the heat of the cooking chamber through suitable heat barriers.

DE 10 2005 044 347 A1 discloses for example the option to fill a gap between the illuminant and the cooking chamber with a silica-aero gel which also insulates against the heat radiation of the cooking chamber. DE 10 2009 02 775 A1 proposes to place a cylindrical element between the cooking chamber and the LED which cylindrical element is configured light permeable and protects the LED from the heat radiation. Additionally this printed document also discloses a ventilation concept for effective heat dissipation. EP 2 233 839 A1 illustrates for example that a gas filled cylinder is useable to offset the LED from the cooking chamber while still putting a sufficient amount of light into the cooking chamber.

However, it has become apparent that the insulation devices known in the art which protect the LED from heat of the cooking chamber have a disadvantageous effect on the light yield and furthermore render orienting the light for optimum illumination of the cooking chamber very difficult.

BRIEF SUMMARY OF THE INVENTION

Thus, it is an object of the invention to provide an oven light whose heat barrier protecting the LED substantially does not influence its light emission.

The object is achieved by an oven light including an attachment sleeve which is attachable in a recess of a cooking chamber wall and includes a light permeable cover which closes the recess of the cooking chamber wall, an illuminant which is arranged behind light permeable cover and whose emitted light illuminates the cooking chamber wherein the illuminant is formed by at least one LED which emits the light in a light cone, wherein the LED is arranged on a cooling element which is used for dissipating operating heat from the LED, wherein a heat barrier is arranged between the cover and the LED and protects the LED from a cooking temperature, wherein the light cone penetrates an arrangement plane of the heat barrier.

The core idea of the invention is to protect the LED against heat radiation on a surface that is as large as possible and to only configure the heat shield permeable where the light has to pass through. Thus, a rather thin window pane shaped heat shield is used instead of thick insulation layers. The advantageous embodiment provides that the opening of the heat shield with respect to shape and/or width of the light cone essentially corresponds to a contour of the light cone in an arrangement plane of the heat shield. Thus, the invention takes advantage of the fact that the LED emits essentially emits oriented light which has little scattering. This facilitates providing an opening in the heat shield which is similar to the contour of the light cone with respect to diameter and shape. Thus, the opening will be the smaller, the closer the heat shield is arranged to the LED. This facilitates providing unrestricted light passage through the heat barrier and to simultaneously increase the surface of the heat shield that protects against the heat radiation of the cooking chamber.

In a particularly advantageous embodiment of the invention it is provided that the heat barrier includes plural pane shaped heat shields which are arranged between the LED and the cover and which have a different distance from the LED, wherein the opening of each heat shield with respect to shape and/or width essentially corresponds to a contour of the light cone in the respective arrangement plane.

The inventors have found that a staggered arrangement of plural heat shields behind one another between the LED and the cover of the oven light provides a very effective reduction of the heat load. Thus, care has to be taken that the openings of the heat shields arranged in different positions relative to the LED providing the light pass through increase in size with a distance from the LED. Each opening essentially corresponds to the light cone in the respective arrangement plane with respect to contour and diameter so that the light pass through can be provided almost unimpeded. Thus, it is also essential that the openings of the heat shields can be configured unfilled so that even light losses through translucent materials provided in the beam path can be avoided. This certainly does not preclude that in particular an opening of one of the staggered heat shields that is proximal to the LED can be provided with a support for a reflector and an optic arrangement.

When the heat shields are arranged staggered behind one another they are respectively offset from each other by a gap shaped opening. It is provided that an air circulation between the cooking chamber and an outer oven wall providing heat dissipation is run through the gaps between the heat shields and improves heat dissipation in this portion.

In order to provide a unit that can be mounted easily it is provided that the heat shields are connected with each other and the heat barrier includes support devices for cooling elements at an end of the heat barrier that is oriented away from the cover.

As stated supra it is provided that an opening proximal to the LED forms a support for a reflector and/or an optics arrangement.

It is furthermore provided that the attachment sleeve includes support devices for the heat barrier.

It is a particularly advantageously feature of the invention that the heat barriers are made from materials which have medium to low heat conductivity. Therefore it is conceivable that each heat shield is made from a highly temperature resistant plastic material. Materials from the group of liquid crystal polymers are for example among these highly temperature resistant plastic materials.

Alternatively it is provided that each heat shield is made from a mineral material, in particular mica. Mineral materials are particularly advantageous when the expected heat load is particularly high. This has to do on the one hand side with the expansion properties which are more advantageous compared to the plastic materials recited supra. Additionally the temperature resistance of mineral materials is much higher than the temperature resistance of plastic materials. Mica has the essential advantage that it already includes reflecting portions. Thus, the mica not only hinders heat pass through towards the LED through its low heat conductivity, but it also reflects heat radiation.

The reflection of the heat radiation is further improved when a surface of the heat shield that is oriented towards the cover is configured heat reflecting.

Eventually it is provided that the cover, the attachment sleeve, the heat barrier, the LED and the cooling element form a pre-assembled component.

In order to provide controlled scattering of the light it is provided that the attachment sleeve includes a light reflecting inner surface.

BRIEF DESCRIPTION OF THE DRAWINGS

An improved understanding of the invention and additional advantages can be derived from the subsequent description of an advantageous embodiment with reference to drawing figures.

DETAILED DESCRIPTION OF THE INVENTION

Figure 1:
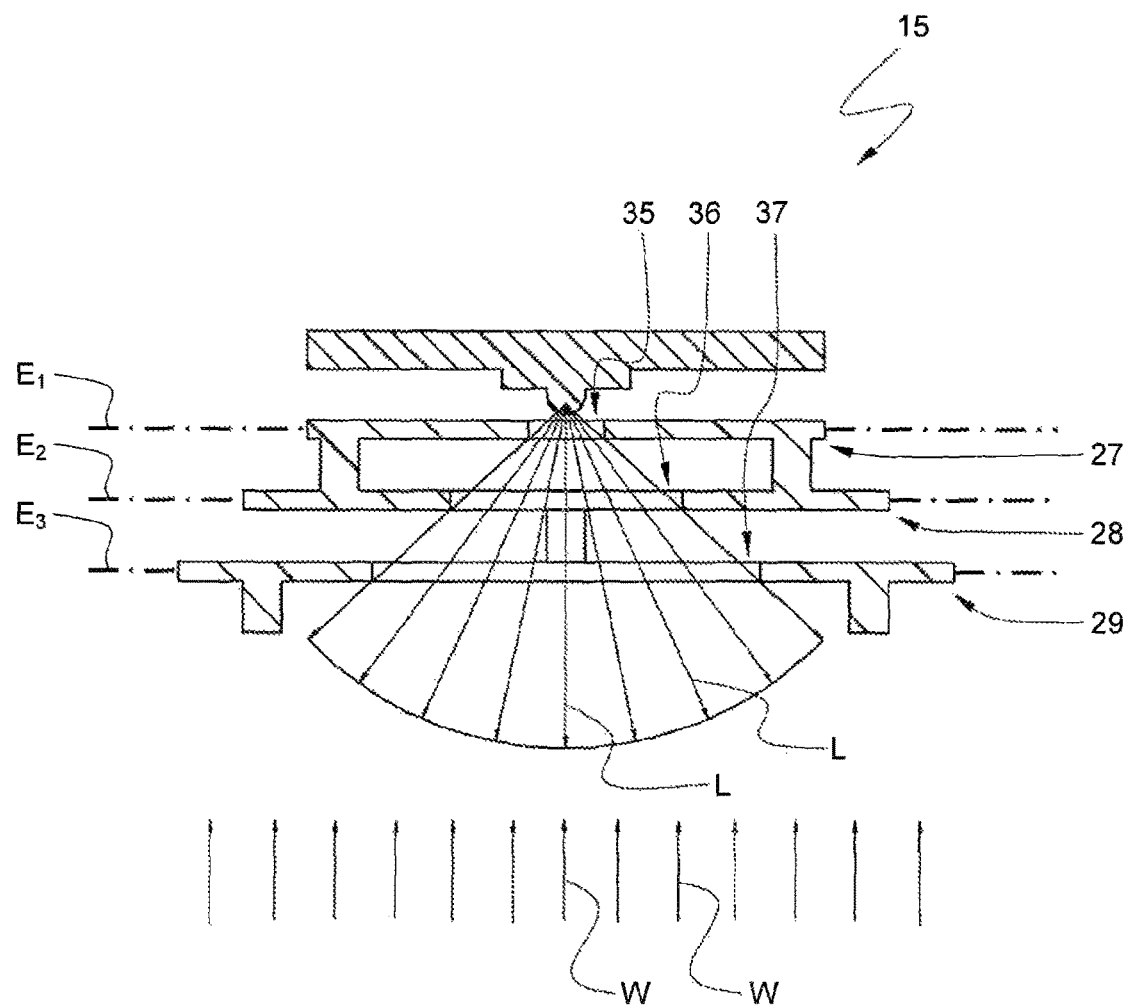
FIG. 1 illustrates a sketch of an operating principle of a heat barrier in an oven light according to the invention.

In the figures an oven light is designated overall with the reference numeral 10.

Figure 2:
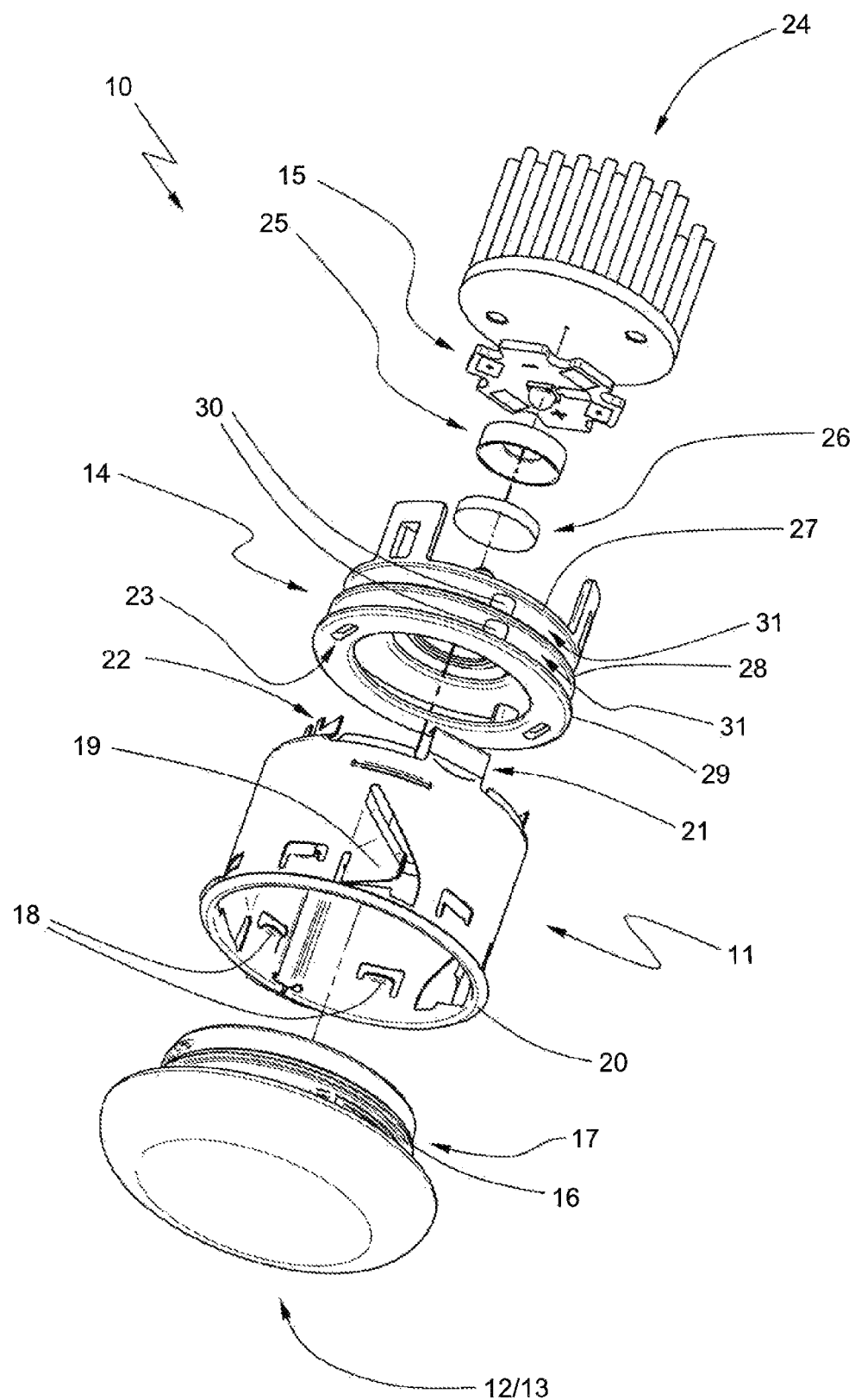
FIG. 2 illustrates an exploded view of the oven light according to the invention in a first embodiment.

As illustrated in the exploded view in FIG. 2 the oven light 10 includes an attachment sleeve 11 for the oven light 10 in a recess of a cooking chamber wall. The attachment sleeve 11 is provided with a light permeable cover 12 configured as a cover glass 13 at a side oriented away from the LED 15. The cover glass 13 includes a shaft 17 that is provided with an external thread 16. The attachment sleeve 11 includes protrusions 18 directed into an interior space of the attachment sleeve 11 and forming thread path sections. Through an interaction of the exterior thread 16 with the protrusions 18 the cover glass 13 is threadable into the attachment sleeve 11. Interlocking lobes 19 of the attachment sleeve 11 are offset towards the LED 15 by a flange shaped collar 20. The interlocking lugs 19 receive an oven wall between themselves and the collar 20 and thus fixate the oven light 10 at the cooking chamber wall.

Thus, the attachment sleeve 11 has first retaining devices 21 and positioning pins 22 at ends oriented towards the LED 15. The first retaining devices 21 are used for fixating a heat barrier 14 at the attachment sleeve 11. The heat barrier 14 includes positioning openings 23 that are associated with the positioning pins 22. The positioning pins 22 engage the positioning openings 23 in order to fixate the heat barrier 14 at the attachment sleeve 11. The retaining devices 21 fixate the heat barrier 14 at the attachment sleeve 11.

The oven light 10 furthermore includes a cooling element 24 on which the LED 15 is arranged with its circuit board. The cooling element 24 is used for dissipating operating heat from the LED 15 to the ambient air. In order to assure good light yield and in order to influence the light emitted by the LED 15 a reflector 25 and an optical element 26 are provided.

The heat barrier 14 includes 3 heat shields that are arranged offset from each other and which are designated with reference numerals 27-29. The heat shields 27 and 28 and 28 and 29 are configured pane shaped and attached at one another through spacers 30 so that a respective air gap 31 is formed between the first heat shield 27 and the second heat shield 28 and between the second heat shield 28 and the third heat shield 29.

Eventually the heat barrier 14 includes second retaining elements 32 at its end oriented towards the LED 15 wherein the second retaining elements can for example be configured as interlocking elements. The interlocking elements are used for fixating the cooling element 24 at the heat barrier 14, wherein the LED circuit board is supported between the heat barrier 14 and the cooling element 24. Thus, a separate attachment of the LED circuit board at the cooling element 24 is not required.

Figure 3:
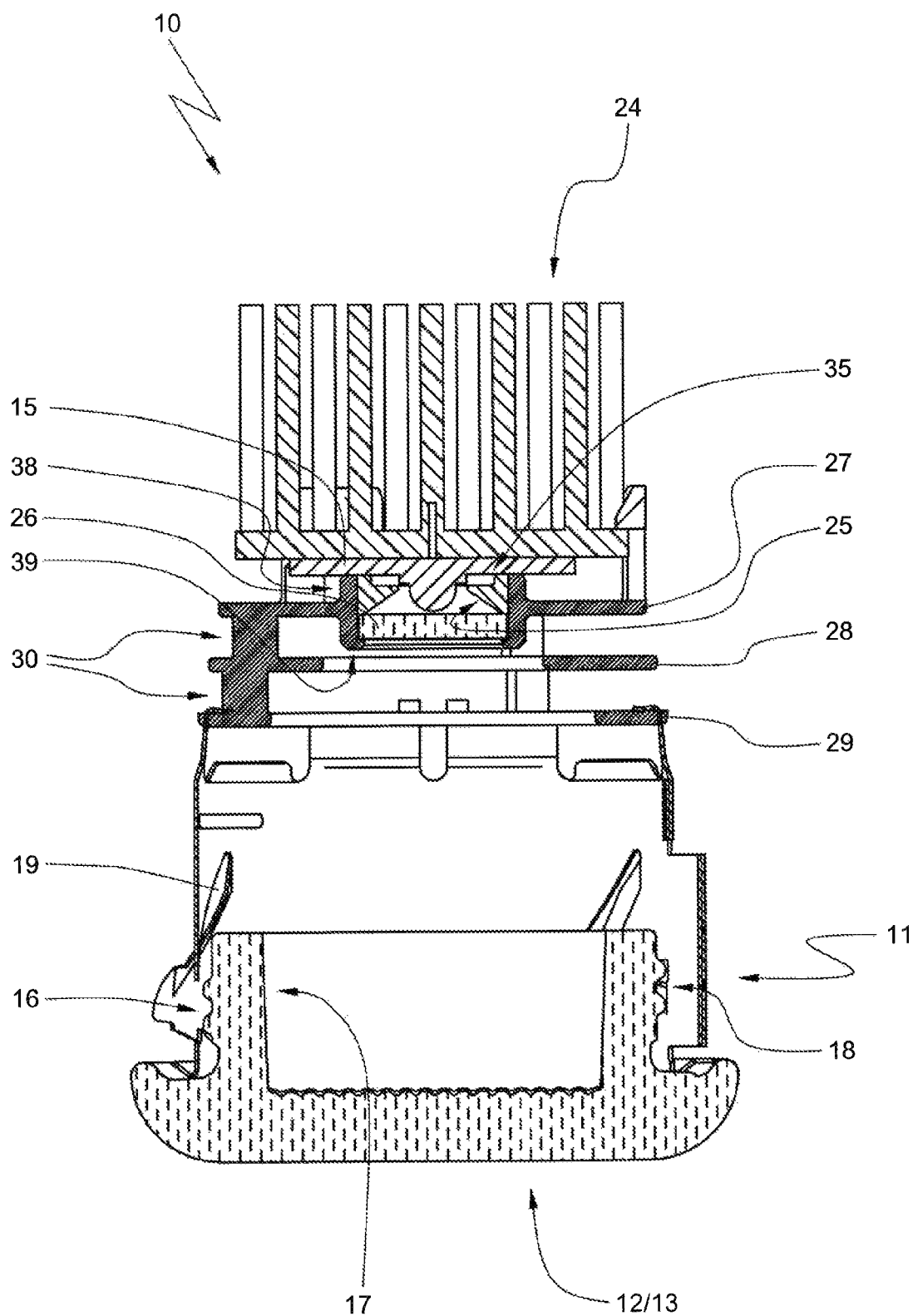
FIG. 3 illustrates a longitudinal sectional view of the oven light according to FIG. 2.

In the first embodiment of the invention according to FIGS. 2 and 3 the heat barrier 14 is a one piece injection molded plastic component.

Figure 5:
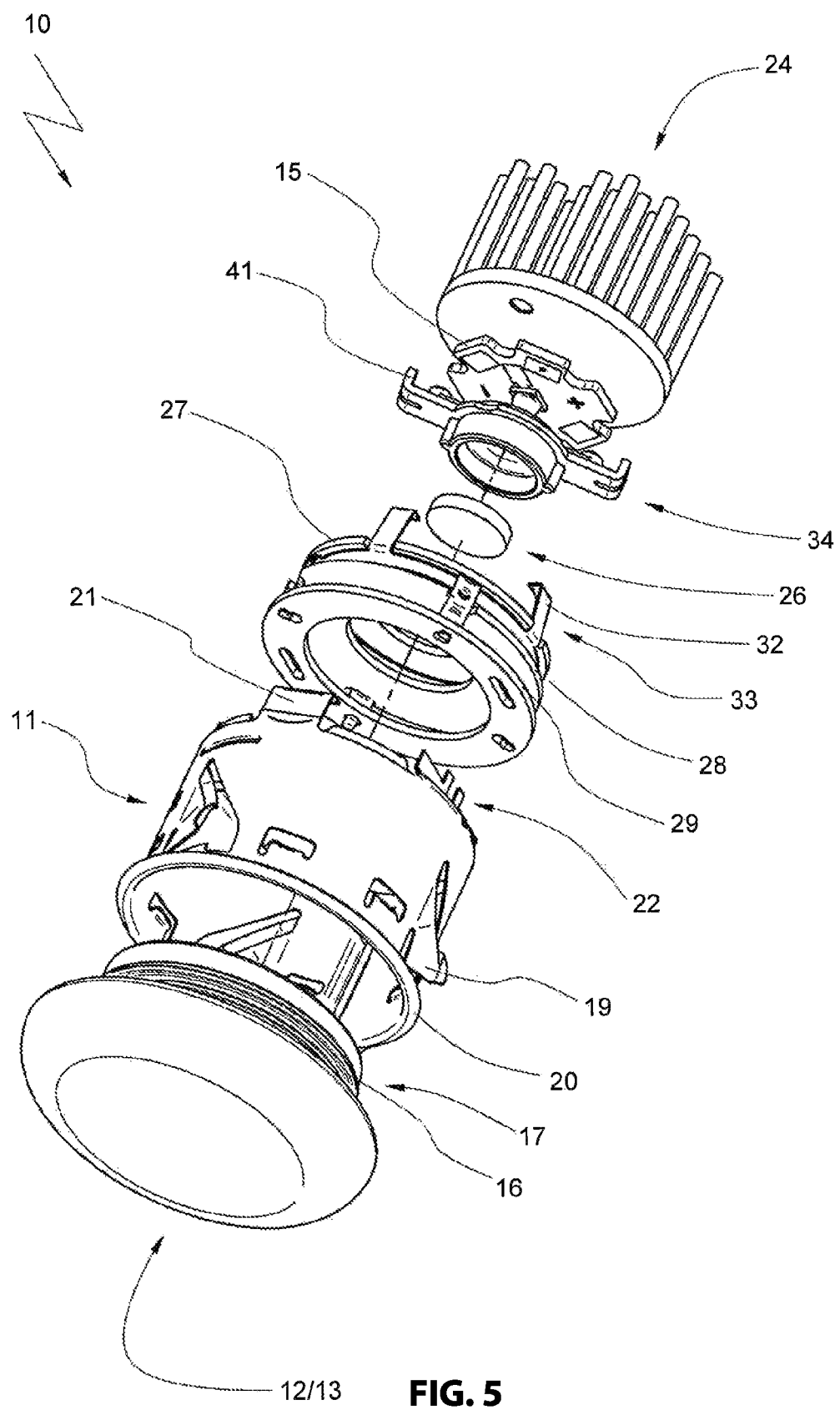
FIG. 5 illustrates an exploded view of a second embodiment of an oven light according to the invention.
Figure 6:
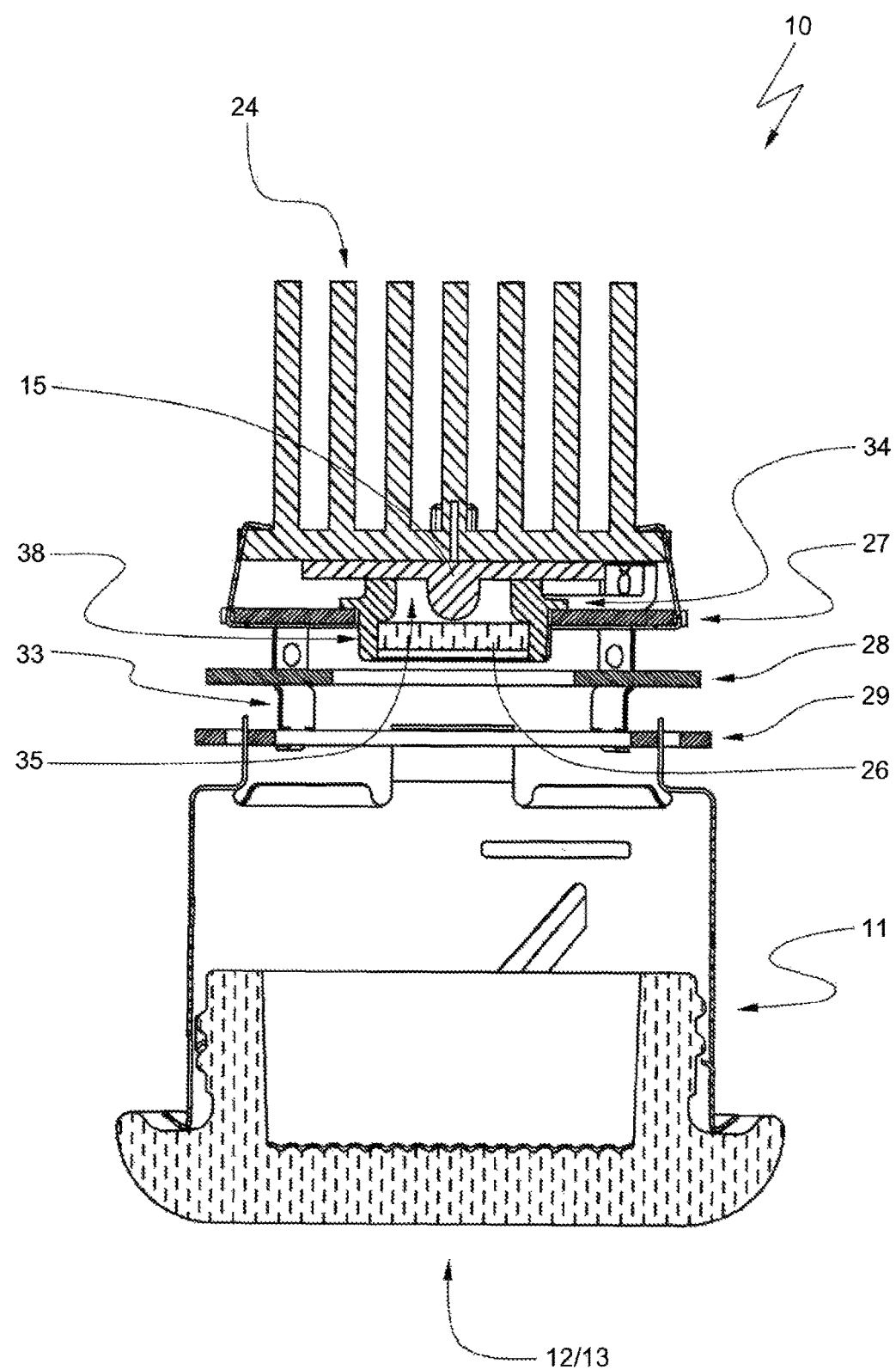
FIG. 6 illustrates the oven light according to FIG. 5 in a longitudinal sectional view.

FIGS. 5 and 6 illustrate a second embodiment of the invention. It differs essentially only through the configuration of the heat barrier 14 which is made in this embodiment from individual pane shaped mineral heat shields 27 through 30. These heat shields are attached at one another through a support clamp 33 which in turn forms second support devices 32 for arranging the cooling element at the heat barrier 14. In order to be able to arrange the reflector 25 and/or the optical element 26 in the portion of the LED 15 a separate optical support 34 is provided in this embodiment. In this second embodiment the retaining clamp 36 defines the position of the heat shields 27 through 29 and the distance between them.

An essential element of the oven light 10 according to the invention is a novel configuration of the heat barrier 14. This portion of the invention is now described with reference to FIG. 1. FIG. 1 omits a number of elements of the oven light 10 for purposes of clarity. The LED 15 and the heat shields 27, 28 and 29 are illustrated. The first heat shield 27 is arranged proximal to the LED 15, the third heat shield 29 is arranged remote from the LED. The second heat shield 28 is arranged between the first heat shield 27 and the third heat shield 29. An essential feature of the heat shields 27, 28, 29 is their pane configuration. Each heat shield 27 through 29 is arranged parallel to the LED circuit board. Each heat shield 27 through 29 is made from a light permeable material and respectively includes an opening. The openings are provided with the reference numerals 35 through 37.

LEDs essentially provide oriented light so that the LED 15 emits a cone shaped beam bundle with a defined opening angle. The light cone K in FIG. 1 is defined by exemplary light beams L. The opening angle of the light cone K is approximately 120°.

Each heat shield 27 through 29 is arranged respectively in an arrangement plane E1-E3 and the non illustrated cover 12. The light cone K passes through each of these arrangement planes E1-E3, wherein its enveloping lines define surfaces in the respective plane E1-E3 that have approximately identical contours but different sizes. The respective surface is an image of the light beam contour in the respective plane E1-E3.

In order to provide unimpeded light passage through the heat shields 27-29 the openings 35-37 are provided in the respective heat shield 27-29. Thus, the opening 35-37 of each heat shield 27-29 with respect to shape and/or width essentially corresponds to the contour of the light cone K in the respective arrangement plane E1-E3. Put differently a surface is cut out in a shape of an opening 35-37 in the respective heat shields 27-29 wherein the opening is defined by the enveloping lines which intersect the respective arrangement plane E1-E3.

With an increasing distance of the heat shield 27-29 from the LED 15 the respective openings 35-37 become larger. Accordingly the opening 35 of the first heat shield 27 is the smallest opening, the opening 36 of the second heat shield 28 is larger corresponding to the expanding light cone. In the embodiment according to FIG. 1 the opening 37 of the third heat shield 29 has the greatest width.

When the respective opening 35-37 in the respective arrangement plane E1-E3 corresponds to the contour of the light cone K in the respective arrangement plane E1-E3 also the edge beams of the light cone K will run freely through the respective openings 35-37. When statements are made that the openings with respect to contour and/or width essentially correspond to the contour of the light cone in the respective arrangement plane, this means that the applicant has certain latitude when practicing the invention. On the one hand side it is conceivable that the openings 35-37 are slightly larger than required corresponding to the dimensions of the light cone K in the respective arrangement plane E1-E3. This helps to compensate for production tolerances in the LEDs 15 which can lead to slightly varying opening angles of the light cones K. Furthermore this helps to counter arrangement tolerances between the LED 15 and the heat shields 27-29 in the sense of a maximum light yield.

By the same token it is conceivable, however, that the openings 35-37 are configured narrower. Thus, a loss of light power occurs through shadowing of the peripheral beams of the light cone K. In turn, however, the heat shielding is improved. It is also well known that LEDs 15 do not necessarily emit light in a shape of a circular cone so that deviations from the cone contour of the LED 15 facilitate influencing the contour of the actually exiting light cone K. When using typical LEDs 15 which emit light in a shape of a circular cone deviations from the circular cone contour can be used to influence a desired exit contour of the light cone K.

It is apparent from FIG. 1 how the heat shields are used for heat shielding the LED 15. The heat radiation is indicated by arrows W. The heat radiation is oriented essentially perpendicular to the circuit board. Each heat shield 27-29 absorbs a portion of the heat radiation W. The absorption is thus optimized specific to the arrangement pane. Thus, each heat shield 27-29 is opened by the respective opening 35-37 just to the extent which is required for optimized light exit. The remaining surface of the heat shields 27-29 in the respective arrangement plane E1-E3 is available for absorbing the heat radiation.

It is provided to produce the heat shields 27-29 from a material with low heat conductivity, so that a transfer of heat radiation from a heat shield 27 through 29 to another heat shield 27-29 is as small as possible. High temperature resistant plastic materials, for example from the group of liquid crystal polymers have proven suitable. Mineral materials, however, are particularly suitable, in particular layered minerals for example mica. In addition to low heat conductivity of the materials it is furthermore provided that air circulates along the gaps 31 between the heat shields 27-29 wherein the air is also used for heat dissipation. Eventually heat shielding can be significantly improved in that surfaces of the heat shields 27-29 oriented towards the cover 12 are provided with a heat reflecting coating.

To sum it all up the advantage of all embodiments of the invention is that contrary to the prior art stacking plural pane shaped heat shields 27-29 behind one another in different arrangement planes, E1-E3 minimizes the heat radiation emitted by the cooking cavity in view of maximum light yield. This is achieved by the invention in that each heat shield 27-29 is only opened far enough as required by the light cone K emitted by the LED 15, whereas the remaining surface portions are closed.

The embodiments of the oven light 10 in FIGS. 2 and 3 and 5 and 6, however, are configured differently due to the heat shields 27-29 having different configurations. As stated supra the heat barrier 14 in the first embodiment of FIGS. 2 and 3 is configured as a one piece injection molded plastic component. Selecting plastic as a material for configuring the heat shields 27-29 facilitates in a simple manner to configure the first heat shield 27 to support reflectors 25 and optical elements 26. According to FIG. 3 the first heat shield 27 forms an annular wall 38 that envelops its opening 35 and that is oriented perpendicular to the LED circuit board. The annular wall 38 is sized with respect to its height so that it can receive a reflector 25 and an optical element 26 configured as a cover glass or a lens. In order to provide a secure support of the reflector 25 and the optical element 36 the annular wall 38 includes an inward oriented support flange 39 at its end oriented towards the cover 12. Since eventually an inner circumference of the support flange 39 defines the optically effective opening width and opening contour of the opening 35 of the first heat shield this has to be considered in view of maximizing the light yield.

Using mineral materials for producing the heat shields 27-29 necessitates certain configurative changes due to the material properties which are considered in the second embodiment according to FIGS. 5 and 6. The heat shields 27-29 included therein are respectively configured as individual elements. However, they are attached amongst each other by a metal support clamp 33. Thus, a separate optics support 34 is provided in order to arrange reflectors 25 or optics elements 26 for example configured as a lens or glass cover in front of the LED 15. Also the optics support includes an annular wall 38 with a reflector 25 or an optical element 26 arranged therein. This annular wall 38 penetrates the opening 35 of the first heat shield 27 and includes an annular flange 40 with an expanded diameter. The annular flange contacts a bottom side of the first heat shield 27 that is oriented towards the LED 15, so that a precisely positioned and supported arrangement is provided. Additionally the optical support 34 can be fixated at the cooling element 24 through bars 41.

FIGS. 2 and 3 and also FIGS. 5 and 6 illustrate that the attachment sleeve 11 is the supporting element for the cover 12 and also for the heat barrier 14 and the cooling element 24 arranged thereon. The reflector 25, the optical element 26 and the LED 15 are also components that are coupled together. This way an oven light 10 is provided that can be pre-assembled and inserted into a recess in the cooking cavity with a few manual steps during the assembly process of an oven.

Figure 4:
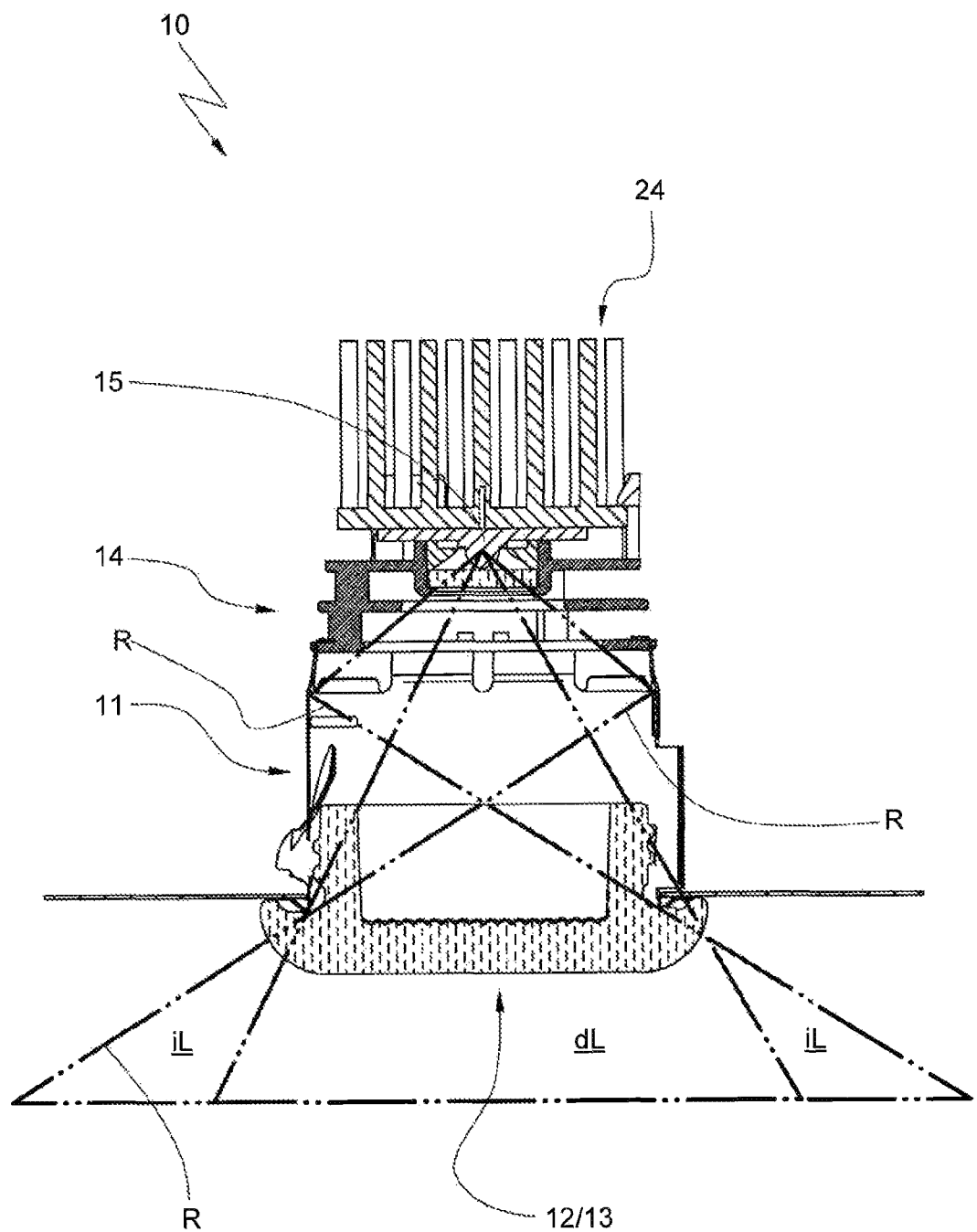
FIG. 4 illustrates a simplified illustration of the light emission of the oven light according to the invention according to FIG. 2.

It is illustrated based on FIG. 4 how the light emitted by the LED 15 propagates through the heat barrier 14 and the cover 12 into the cooking cavity. Due to the optimized opening width of the openings 35-37 of the heat shields 27-29 of the heat barrier 14 the light emissions of the LED 15 reach the portion of the attachment sleeve 11 unimpeded. A portion of the light emission can propagate into the cooking cavity of the oven as direct light dL unimpeded by the light permeable cover 12. Since the opening in the cooking cavity wall, however, is smaller than the extension of the light cone K in this plane the peripheral beams of the light cone K are deflected by a reflecting inner surface of the attachment sleeve 11 and propagated through the light permeable cover 12 into the cooking cavity. Thus this portion reaches the cooking cavity as indirect light iL. Thus, a distance between the reflection portion of the attachment sleeve 11 for the peripheral beam of the light cone K and the recess of the cooking cavity wall is sized so that the peripheral beams pass through the light permeable cover 12 proximal to the recess edge of the oven wall. This way it is assured that no substantial light losses are to be expected also in this portion.

REFERENCE NUMERALS AND DESIGNATIONS 10 oven light
11 attachment sleeve
12 light permeable cone
13 cover glass
14 heat barrier
15 LED
16 external thread
17 shaft
18 protrusion
19 interlocking lobe
20 collar
21 first retaining device
22 positioning pin
23 positioning opening
24 cooling element
25 reflector
26 optical element
27 first heat shield
28 second heat shield
29 third heat shield
30 spacer
31 air gap
32 second retaining device
33 support clamp
34 optics support
35 openings of 27
36 opening of 28
37 opening of 29
38 annular wall
39 support flange
40 annular flange
41 bar
K light cone
L light beam
dL direct light
iL indirect light
W heat radiation
E1-E3 arrangement planes

What is claimed is:

1. An oven light comprising:
   an attachment sleeve which is attachable in a recess of a cooking cavity wall of a cooking cavity;
   a light permeable cover which closes the recess of the coking cavity wall;
   an illuminant which is arranged behind the light permeable cover and whose emitted light is used for illuminating the cooking cavity,
   wherein the illuminant is formed by at least one light-emitting diode (LED) which emits light in a light cone,
   wherein the at least one LED is arranged on a cooling element which dissipates operating heat of the at least one LED,
   wherein a heat barrier is arranged between the cover and the at least one LED and protects the at least one LED from a cooking temperature,
   wherein the light cone penetrates an arrangement plane of the heat barrier,
   wherein the heat barrier includes a plurality of disc-shaped light permeable heat shields each with an opening through which light of the at least one LED propagates in a direction towards the cover, wherein each heat shield is arranged between the LED and the cover at different respective distances from the LED,
   and wherein the opening of each respective heat shield is increased with increased distance from the LED such that the plurality of heat shield openings correspond to contours of the light cone in a respective arrangement plane that is coplanar with each respective heat shield with respect to shape or width of the light cone.

2. The oven light according to claim 1, wherein the heat shields are connected with each other and the heat barrier includes support devices for the cooling element at an end of the heat barrier oriented away from the cover.

3. The oven light according to claim 1, wherein an opening proximal to the at least one LED forms a support for a reflector and/or optics.

4. The oven light according to claim 1, wherein the attachment sleeve includes support devices for the heat barrier.

5. The oven light according to claim 1, wherein each heat shield is formed from a highly temperature resistant plastic material.

6. The oven light according to claim 1, wherein each heat shield is made from a mineral material.

7. The oven light according to claim 5, wherein a surface of the heat shield oriented towards the cover is configured heat reflecting.

8. The oven light according to claim 1, wherein the cover, the attachment sleeve, the heat barrier, the at least one LED and the cooling element form a preassembled component.

9. The oven light according to claim 1, wherein the attachment sleeve has a light reflecting inner surface.

10. The oven light according to claim 6, wherein the mineral material is mica.

* * * * *